United States Patent [19]
Millet et al.

[11] Patent Number: 5,746,154
[45] Date of Patent: May 5, 1998

[54] HAND-HELD BIRD FEEDER

[76] Inventors: Cedar Millet; Gary Dickson, both of East River Rd., Star Rte., Huntington, Mass. 01050

[21] Appl. No.: 695,652

[22] Filed: Aug. 12, 1996

[51] Int. Cl.⁶ .................................................. A01K 39/01
[52] U.S. Cl. ............................................................ 119/57.8
[58] Field of Search .............................. 119/57.8, 51.03, 119/468, 537; D30/124, 125, 129, 133

[56] References Cited

U.S. PATENT DOCUMENTS

| | | | |
|---|---|---|---|
| D. 355,625 | 2/1995 | Blahowski | D30/133 |
| 4,498,423 | 2/1985 | Gainsboro | |
| 4,819,584 | 4/1989 | Rozumek | |
| 5,289,796 | 3/1994 | Armstrong | |

OTHER PUBLICATIONS

Howard, L. *Birds as Individuals*, 1953, p. 23, Doubleday & Company, Inc. New York.

Simonds, C. *Private Lives of Garden Birds*, 1984, pp. 44–57, The Globe Pequot Press, Chester, CT.

Martin, A. *Hand–Training Wild Birds at the Feeder*, 1963, pp. 31–34, Alan C. Hood & Co., Inc. Brattleboro, VT.

Smith, S. *The Black–Capped Chickadee*, 1991, pp. 223–252 and pp. 1–45, Cornell University Press, Ithaca, NY.

*Primary Examiner*—Edgar S. Burr
*Assistant Examiner*—Amanda B. Sandusky
*Attorney, Agent, or Firm*—Anthony Claiborne

[57] ABSTRACT

Embodiments of a new hand-held bird feeder are disclosed, permitting economical construction, the use of which feeder enables the bird feeding enthusiast actively to entice birds to feed, to feed birds in close proximity, and to relocate the site of feeding as necessary. The preferred embodiment discloses a cane with two ends, one of which is adapted for use as a handle, a receptacle for holding bird feed affixed to the end of the cane distal from the handle, and a perch affixed to the cane proximal to the receptacle.

2 Claims, 1 Drawing Sheet

HAND-HELD BIRD FEEDER

BACKGROUND OF THE INVENTION

This invention relates to a hand-held bird feeder.

Bird feeders in common use today are generally mounted to or suspended from a fixed object. In order for a bird feeding enthusiast to be in close proximity to birds feeding from commonly available bird feeders, the enthusiast must either be positioned close to such a feeder before birds arrive to feed, or the enthusiast must approach feeding birds. The former situation may involve long and fruitless waiting for approaching birds, while in the latter situation the approach of the enthusiast may startle feeding birds which then flee, frustrating the object of observing feeding birds in close proximity.

A further limitation of bird feeders in common use today is that, because they are mounted to or suspended from fixed objects, changing the place of feeding requires the expenditure of effort to unmount or unsuspend and to remount or resuspend the feeder.

Yet a further limitation of bird feeders in common use today is that, because of they are fixed in place, they may not be as likely to attract the feeding of particular species of birds that respond more readily to active enticement.

One object of the present invention is to provide a bird feeder that is simple in design and economical to construct, that allows the bird feeding enthusiast to feed birds in close proximity. Another object of the invention is to allow the bird feeding enthusiast to relocate the place of feeding. A further object of the invention is to allow the bird feeding enthusiast to manipulate the feeder so as to attract the feeding of birds that respond more readily to active enticement. These and further objects of the invention will be apparent from the following description of the preferred embodiments thereof.

BRIEF SUMMARY OF THE INVENTION

The bird feeder comprises a cane having two ends, one end of which is a handle for a bird feeding enthusiast to hold and manipulate. Integral to, or disposed upon, the cane, distal from the handle and mounted roughly perpendicular to the cane, is a perch upon which birds may rest. Disposed upon the cane, adjacent to the perch, is an open receptacle for holding and dispensing bird feed. The receptacle is positioned upon the cane so that birds may rest upon the perch and feed from the receptacle. In the preferred embodiment, the receptacle is positioned toward the handle from the perch, so that birds resting upon the perch and feeding from the receptacle do so facing the handle and thus facing the bird feeding enthusiast.

The invention is used by placing bird feed such as black oil sunflower seed for Chickadees, other seed recommended to attract feeding birds, or alternatively suet, within the feeding receptacle. The bird feeding enthusiast holds the feeder by the handle, extending the feeder toward a bird, up and away from the enthusiast's body, showing the seed to the bird, with the intention of enticing the bird to land upon the perch and feed from the receptacle.

BRIEF DESCRIPTION OF THE DRAWINGS

The invention is further described in connection with the accompanying drawings, in which.

DETAILED DESCRIPTION

Figure 4:
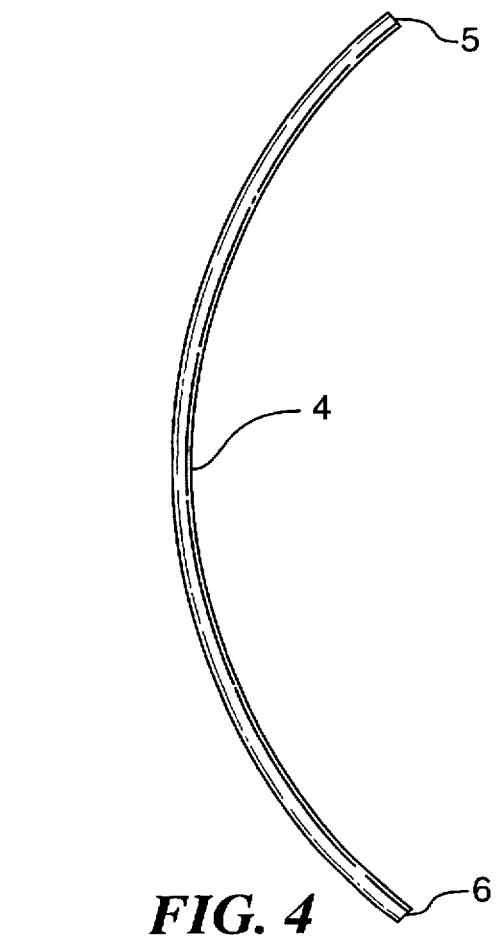
FIG. 4 is a side view of the cane 4 of the preferred embodiment with ends 5 and 6.

A preferred embodiment of the present invention is constructed as follows:

Beginning with a first rattan cane 10 to 12 mm (0.3937 to 0.4724 inches) in diameter, curved in approximately ⅕ to ¼ arc of a full circle, with linear distance of approximately 16 inches between its ends, as shown in FIG. 4 between the ends 5 and 6 of first cane 4, the first cane is split at one end in a plane parallel to the arc of the first cane for a length of approximately 4 inches.

Approximately ¼ inch from the split end of the first cane, a hole approximately 3/16 inches in diameter is drilled through the first cane perpendicular to the plane of the arc of the first cane.

Figure 5:
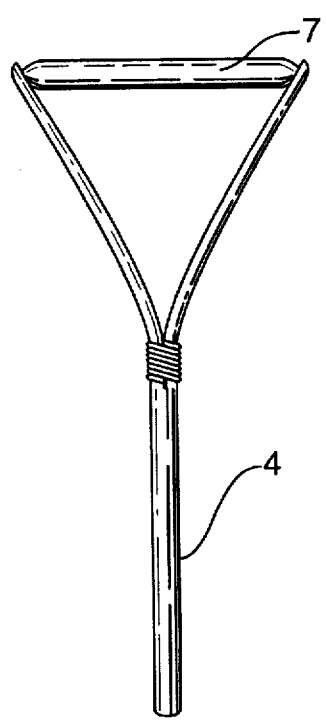
FIG. 5 is a top view of the cane 4 of the preferred embodiment with attached perch 7.

A second rattan cane approximately 3 ¾ inches in length and 8 mm (0.3150 inches) in diameter is sharpened at both ends to form a perch. The perch is affixed to the first cane by spreading the first cane along the split, and inserting the ends of the second cane into the hole in the first cane on each side of the split, the split sides of the first cane and the second cane forming a triangle in which a feeding receptacle may be mounted as shown in FIG. 5. The perch is secured to the split first cane with wood glue.

Waxed linen is wrapped around the first cane along its circumference immediately below and immediately above the split and secured by glue or staple, to prevent the first cane from splitting further and to simulate traditional rattan cane construction.

Figure 1:
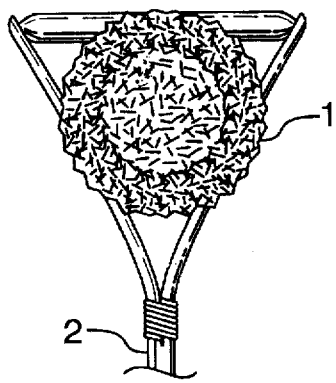
FIG. 1 is a top view of a hand held bird feeder employing a simulated bird nest 1 as the receptacle for holding and dispensing bird feed, with the handle end of the cane 2 truncated.
Figure 2:
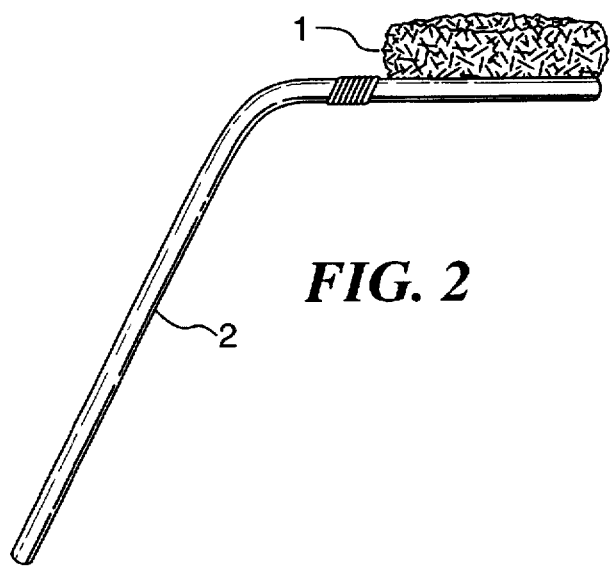
FIG. 2 is a side view of the feeder shown in FIG. 1, in this embodiment with an arced cane 2.

In one embodiment of the invention as in FIG. 1, a receptacle 1 comprised of a dish of intertwined rattan root approximately 2 ½ inches in diameter, forming a simulated bird nest, is mounted within or upon the triangle in the cane by means of hot glue.

Figure 3:
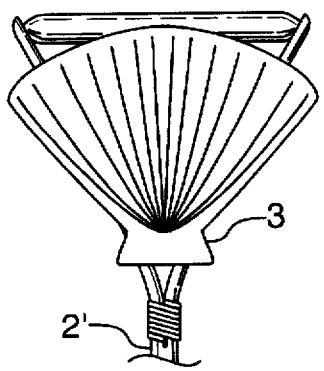
FIG. 3 is a top view of another embodiment of the invention, with a shell or simulated shell 3 as the receptacle for holding and dispensing bird seed, with the handle end of the cane 2' truncated.

In another embodiment of the invention as in FIG. 3, a receptacle 3 comprised of a scallop shell approximately 2 ½ inches in diameter is mounted within or upon the triangle in the cane in a similar fashion.

While preferred embodiments of the invention have been shown and described, it will be apparent to those skilled in this art that various modifications may be made in these embodiments without departing from the spirit of the present invention. For that reason, the scope of the invention is set forth in the following claims:

We claim:

1. A hand-held bird feeder, comprising:
   a cane having two ends, one end of which forms a handle, the other end of which is forked to form two branches;
   a perch;
   a means of affixing said perch to said cane, proximate to the end of each branch of the fork of said cane; and
   a receptacle for holding feed affixed to said cane proximate to said perch.

2. A hand-held bird feeder as in claim 1, wherein
   said branches are bent so that when the cane extends approximately 45° to the horizontal, said branches of the fork are substantially horizontal.

* * * * *